United States Patent
Kondo et al.

(10) Patent No.: US 9,564,690 B2
(45) Date of Patent: Feb. 7, 2017

(54) TERMINAL STRUCTURE FOR COVERED ELECTRIC WIRE

(71) Applicant: FUJIKURA LTD., Tokyo (JP)

(72) Inventors: Masahiro Kondo, Sakura (JP); Kohki Ishikawa, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/894,740

(22) PCT Filed: May 30, 2014

(86) PCT No.: PCT/JP2014/064523
§ 371 (c)(1),
(2) Date: Nov. 30, 2015

(87) PCT Pub. No.: WO2014/192946
PCT Pub. Date: Dec. 4, 2014

(65) Prior Publication Data
US 2016/0134028 A1   May 12, 2016

(30) Foreign Application Priority Data

May 31, 2013  (JP) .................................. 2013-116018

(51) Int. Cl.
*H01R 4/18*  (2006.01)
*H01R 13/405*  (2006.01)
(Continued)

(52) U.S. Cl.
CPC ............. *H01R 4/183* (2013.01); *H01R 4/70* (2013.01); *H01R 13/405* (2013.01);
(Continued)

(58) Field of Classification Search
CPC ......... H01R 4/183; H01R 4/184; H01R 4/185; H01R 13/405
See application file for complete search history.

(56) References Cited

U.S. PATENT DOCUMENTS 3,763,460 A * 10/1973 Hatschek ............. H01R 13/533
439/277
4,700,271 A * 10/1987 Iio ........................ H01R 9/2483
361/638
(Continued)

FOREIGN PATENT DOCUMENTS

CN    101601173 A   12/2009
EP    2 083 480 A2    7/2009
(Continued)

OTHER PUBLICATIONS

International Search Report dated Jul. 1, 2014, issued in counterpart Application No. PCT/JP2014/064523 (1 page).
(Continued)

*Primary Examiner* — James Harvey
(74) *Attorney, Agent, or Firm* — Westerman, Hattori, Daniels & Adrian, LLP

(57) ABSTRACT

A terminal structure includes: a terminal portion including a tip of a covered electric wire; a connection terminal having a crimp portion crimped to the terminal portion; and a mold resin of a hygroscopic reactive type covering the terminal portion and the crimp portion. The crimp portion includes a conductive crimp portion crimped to the tip. The mold resin includes a first portion covering the conductive crimp portion and the tip; a second portion covering a part of the connection terminal which is further toward a tip than the tip, the part having a thickness smaller than the conductive crimp portion; and a first step formed between the first portion and the second portion such that the height of the mold resin decreases from the first portion to the second portion. A first recess formed on the second portion.

5 Claims, 4 Drawing Sheets

(51) Int. Cl.
*H01R 4/70* (2006.01)
*B29C 45/14* (2006.01)

(52) U.S. Cl.
CPC ...... *B29C 45/14639* (2013.01); *B29K 2995/0097* (2013.01); *H01R 4/185* (2013.01)

(56) References Cited

U.S. PATENT DOCUMENTS

| | | | | |
|---|---|---|---|---|
| 4,718,865 | A * | 1/1988 | Cordeiro | H01R 13/405 439/606 |
| 6,981,897 | B2 | 1/2006 | Sakatani | |
| 8,480,421 | B2 * | 7/2013 | Yoshioka | H01R 43/24 439/275 |
| 8,771,015 | B2 * | 7/2014 | Inoue | H01R 4/70 439/604 |
| 2001/0003687 | A1 | 6/2001 | Kondo | |
| 2010/0075535 | A1 * | 3/2010 | Mizutani | H01R 13/504 439/588 |
| 2011/0070781 | A1 | 3/2011 | Kitagawa et al. | |
| 2012/0325552 | A1 * | 12/2012 | Sakura | H01R 4/185 174/74 R |
| 2013/0252459 | A1 | 9/2013 | Tanaka et al. | |
| 2014/0144016 | A1 * | 5/2014 | Bauer | B23K 26/20 29/863 |
| 2014/0215818 | A1 | 8/2014 | Matsushita | |
| 2014/0335741 | A1 * | 11/2014 | Uno | H01R 4/185 439/736 |
| 2015/0011117 | A1 * | 1/2015 | Ohnuma | H01R 4/185 439/520 |
| 2015/0091206 | A1 * | 4/2015 | Sato | B29C 45/14065 264/229 |
| 2016/0111809 | A1 * | 4/2016 | Kataoka | H01R 13/5205 439/587 |
| 2016/0134028 | A1 * | 5/2016 | Kondo | H01R 4/183 439/877 |

FOREIGN PATENT DOCUMENTS

| | | |
|---|---|---|
| JP | 2003-243144 A | 8/2003 |
| JP | 2005-5201 A | 1/2005 |
| JP | 2008-258070 A | 10/2008 |
| JP | 2010-097704 A | 4/2010 |
| JP | 2010-165630 A | 7/2010 |
| JP | 2012-129178 A | 7/2012 |
| JP | 2013-008610 A | 1/2013 |
| JP | 2013-84412 A | 5/2013 |
| JP | 2013-98161 A | 5/2013 |
| JP | 2013-131446 A | 7/2013 |

OTHER PUBLICATIONS

Notification of Refusal dated Feb. 4, 2014, issued in counterpart Application No. JP 2013-116018, with English Translation (7 apges).

Han, B et al., "Characterization of Hygroscopic Swelling Behavior of Mold Compounds and Plastic Packages", IEEE Transactions on Components and Packaging Technologies, vol. 27, No. 3, Sep. 2004, pp. 499-506.

Extended (Supplementary) European Search Report dated May 27, 2016, issued in counterpart European Patent Application No. 14 80 5116. (10 pages).

Chinese Office Action dated Dec. 5, 2016, issued in counterpart Chinese Patent Application No. 201480030726.8.

* cited by examiner

A - A' SECTION

B - B' SECTION

TERMINAL STRUCTURE FOR COVERED ELECTRIC WIRE

TECHNICAL FIELD

The present invention relates to a terminal structure for a covered electric wire in which a terminal portion of a covered electric wire having a connection terminal mounted thereto is covered with a mold resin for waterproofing.

BACKGROUND ART

A covered electric wire used for a region exposed to water in an automobile has to undergo a waterproof process for preventing moisture intrusion into an insulating coating from its terminal portion. For this, a covered electric wire in which a mold process is performed to a terminal portion having a terminal mounted thereto has been conventionally often used for a region exposed to water (e.g., refer to Patent Literature 1 described below). A resin used for such mold process needs much time to be cured at its thick part.

PRIOR ART DOCUMENT

Patent Literature

Patent Literature 1: JP 2010-097704 A

SUMMARY OF INVENTION

Problem to be Solved by the Invention

However, in the mold process in the related art described in Patent Literature 1, a mold resin covering the terminal portion of the covered electric wire has a certain thickness, and it is considered to reduce the thickness in order to shorten the curing time of the mold resin. However, when the thickness of the mold resin is reduced, the protection of the terminal portion of the covered electric wire might not be sufficient.

The present invention has an object of overcoming the above-mentioned problem due to the conventional technology to provide a terminal structure for a covered electric wire that can shorten a curing time of a mold rein, while changing the thickness of the mold resin in a stepwise manner according to a connection shape between a terminal portion of the covered electric wire and a connection terminal.

Means for Solving the Problem

A terminal structure for a covered electric wire according to the present invention includes: a terminal portion including a tip of a covered electric wire; a connection terminal having a crimp portion crimped to the terminal portion; and a mold resin of a hygroscopic reactive type covering the terminal portion of the covered electric wire and the crimp portion of the connection terminal. The crimp portion includes a conductive crimp portion crimped to the tip of the covered electric wire. The mold resin includes: a first portion covering the conductive crimp portion and the tip of the covered electric wire; a second portion covering a part of the connection terminal which is further toward a tip than the tip of the covered electric wire, the part having a thickness smaller than the thickness of the conductive crimp portion; and a first step formed between the first portion and the second portion such that the height of the mold resin decreases from the first portion to the second portion. A first recess formed on the second portion in the vicinity of the first step so as to recess toward the connection terminal.

With the terminal structure for a covered electric wire according to the present invention, the mold resin of a hygroscopic reactive type includes: a first portion covering the conductive crimp portion and the tip of the covered electric wire; and a second portion covering a part of the connection terminal which is further toward a tip than the tip of the covered electric wire through the first portion and the first step, the part having a thickness smaller than the thickness of the conductive crimp portion, the first recess recessed toward the connection terminal in the vicinity of the first step being formed, and the height of the mold resin decreasing from the first portion of the second portion to the second portion. With this configuration, the thickness of the mold resin is changed in a stepwise manner, and upon curing the mold resin, a part having a large thickness is eliminated to implement uniform and efficient progress of a reaction of the mold resin, whereby the curing time of the mold resin can be shortened.

According to one embodiment of the present invention, the crimp portion includes a covering material crimp portion crimped to a covering material of the covered electric wire, a second step is formed between a third portion of the mold resin covering the covering material crimp portion and the first portion of the mold resin, and a second recess is formed on the first portion in the vicinity of the second step.

According to another embodiment of the present invention, the second step is formed on a position at a back end of the conductive crimp portion.

According to still another embodiment of the present invention, the opening lengths of the first and second recesses in the transverse direction are equal to or less than 1 mm.

According to yet another embodiment of the present invention, the opening widths of the first and second recesses in the longitudinal direction are equal to or larger than a width of a core wire of the covered electric wire.

According to further embodiment of the present invention, the second recess is formed on a position on the conductive crimp portion.

According to still further embodiment of the present invention, the distance between a step surface of the first step of the first portion and the tip of the core wire of the covered electric wire is at least 0.5 mm.

According to yet further embodiment of the present invention, a length from the first step of the second portion to a tip surface is equal to or larger than 2.6 mm.

Effects of Invention

The present invention can provide a terminal structure for a covered electric wire that can shorten a curing time of a mold resin, while changing the thickness of the mold resin in a stepwise manner according to a connection shape between a terminal portion of the covered electric wire and a connection terminal.

EMBODIMENTS FOR CARRYING OUT THE INVENTION

A terminal structure for a covered electric wire according to the embodiments of the present invention will be described below in detail with reference to the accompanying drawings.

First Embodiment

Figure 1:
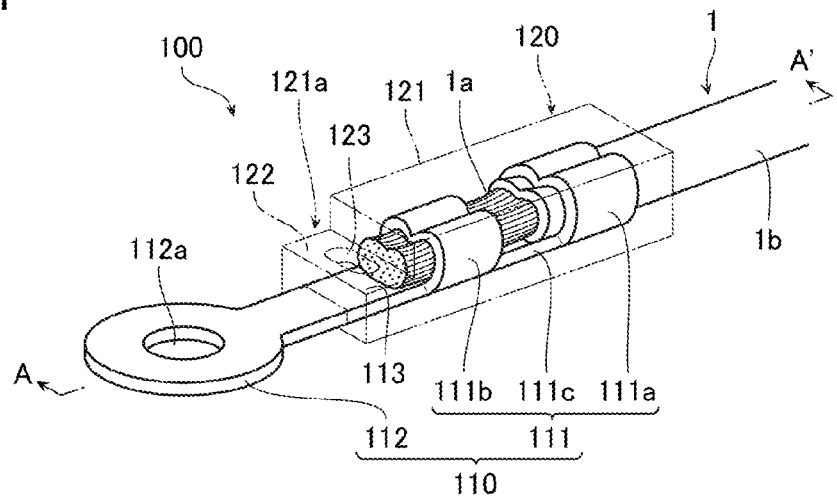
FIG. 1 is a perspective view illustrating a terminal portion of a covered electric wire in a terminal structure for a covered electric wire according to a first embodiment of the present invention, wherein a mold resin is indicated by a virtual line.
Figure 2:
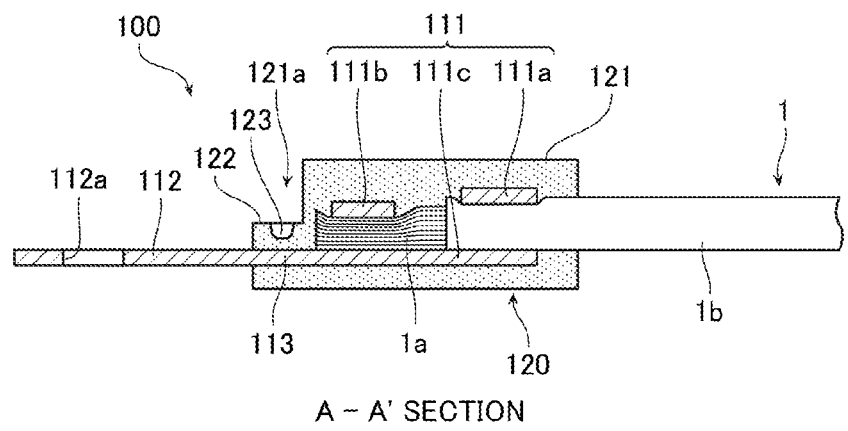
FIG. 2 is a sectional view taken along line A-A' in FIG. 1.

Firstly, a structure of a terminal portion 100 of a covered electric wire according to a first embodiment of the present invention will be described with reference to FIGS. 1 to 3. FIG. 1 is a perspective view illustrating the terminal portion of the covered electric wire in the terminal structure for a covered electric wire according to a first embodiment of the present invention, wherein a mold resin is indicated by a virtual line. FIG. 2 is a sectional view taken along line A-A' in FIG. 1, and FIG. 3 is a perspective view illustrating a connection terminal forming the terminal portion.

As illustrated in FIGS. 1 and 2, the terminal portion 100 of a covered electric wire 1 includes a connection terminal 110 connected to the covered electric wire 1. The covered electric wire 1 includes a core wire 1a formed by bundling a plurality of long thin conductors, and an insulating coating 1b made of an insulating resin that encloses the core wire 1a to insulate and protect the core wire 1a.

The connection terminal 110 is formed by punching or bending a plate-like parent metal. The connection terminal 110 includes an electric wire crimp portion 111 formed to allow the covered electric wire 1 to be crimped to the connection terminal 110, and a contact piece 112 which is provided on a tip side of the electric wire crimp portion 111 and is brought into contact with a counterpart connection terminal such as an earth terminal for fixing the connection terminal 110.

Figure 3:
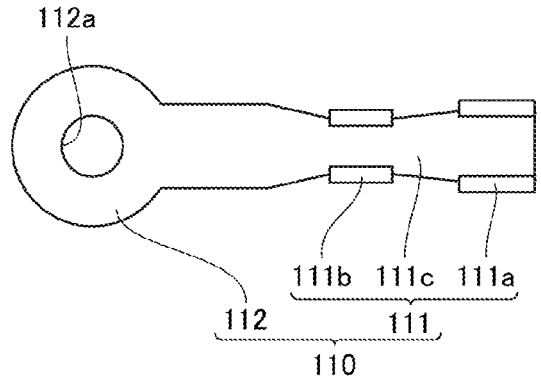
FIG. 3 is a plan view illustrating a connection terminal according to the first embodiment of the present invention.

As illustrated in FIG. 3, the electric wire crimp portion 111 of the connection terminal 110 has insulating coating crimp pieces 111a that are provided to stand upward when not crimping the covered electric wire 1, the insulating coating crimp pieces 111a crimping the insulating coating 1b of the covered electric wire 1 from around to fix the covered electric wire 1 to the connection terminal 110. The electric wire crimp portion 111 of the connection terminal 110 also has core wire crimp pieces 111b that are similarly provided to stand upward, the core wire crimp pieces 111b crimping the core wire 1a of the covered electric wire 1 from around to fix the covered electric wire 1 to the connection terminal 110. The electric wire crimp portion 111 of the connection terminal 110 also has a plate-like connection portion 111c that couples and connects the insulating coating crimp piece 111a and the core wire crimp piece 111b.

On the other hand, the tip of the contact piece 112 is formed into a circular flat plate, for example, and has at its center a circular screw insertion hole 112a into which a screw threaded with the counterpart connection terminal is inserted. The terminal portion 100 of the covered electric wire 1 is also covered and sealed with a mold resin 120 applied to the connection terminal 110.

The mold resin 120 provided to the terminal portion 100 is made of a resin material of a hygroscopic reactive type, and seals the end of the insulating coating 1b of the covered electric wire 1 and the core wire 1a exposed from the end of the insulating coating 1b with the electric wire crimp portion 111. Therefore, the mold resin 120 prevents water intrusion from the end of the covered electric wire 1 into the covered electric wire 1 including the portion between the insulating coating 1b and the core wire 1a.

Specifically, the mold resin 120 has a first portion 121 covering from the periphery of the core wire crimp pieces 111b including the tip of the core wire 1a of the covered electric wire 1 to the periphery of the insulating coating crimp pieces 111a including the insulating coating 1b of the covered electric wire 1 at the distal end (back end) side of the insulating coating crimp pieces 111a, and a second portion 122 that is continuous with the first portion 121 to cover a plate-like portion 113 of the connection terminal 110, the plate-like portion 113 having a thickness smaller than the electric wire crimp portion 111 in the vertical direction (perpendicular direction) and located further toward the tip than the tip of the core wire 1a of the covered electric wire 1.

The mold resin 120 has a first step 121a formed between the first portion 121 and the second portion 122, wherein the height of the mold resin 120 in the vertical direction is decreased from the first portion 121 to the second portion 122. The mold resin 120 also has a first recess 123 formed on the second portion 122 in the vicinity of the first step 121a, the first recess 123 being open upward and recessed downward toward the plate-like portion 113. The thicknesses of the first portion 121 and the second portion 122 and the recessed amount or size of the first recess 123 are determined based on various conditions such as the material of the mold resin 120 or the reaction time.

The thickness of the mold resin 120 between the first step 121a of the first portion 121 and the tip of the core wire 1a of the covered electric wire 1, specifically the distance between the surface (step surface) of the first step 121a and the tip of the core wire 1a, is set to be at least 0.5 mm, for example. With this, balance between the necessary and sufficient thickness of the mold resin 120 at the side close to the first step 121a and the curing time can be ensured.

Specifically, when the core wire 1a of the covered electric wire 1 is crimped to the core wire crimp piece 111b of the connection terminal 110, a projecting amount of the core wire 1a from the tip of the core wire crimp piece 111b during the crimp process might vary, even if the insulating coating 1b is removed to allow the length of the core wire 1a exposed from the tip of the insulating coating 1b to the tip of the core wire 1a to become constant.

For example, in the case where the core wire 1a is crimped to the core wire crimp piece 111b with the state in which the tip of the insulating coating 1b crimped to the insulating coating crimp piece 111a is located close to the back end of the core wire crimp piece 111b, the projecting amount of the core wire 1a from the tip of the core wire crimp piece 111b becomes the maximum, so that the tip of the core wire 1a spreads in the vertical direction and in the horizontal direction to a certain extent.

On the other hand, in the case where the core wire 1a is crimped to the core wire crimp piece 111b with the state in which the tip of the insulating coating 1b crimped to the insulating coating crimp piece 111a is located close to the tip of the insulating coating crimp piece 111a, the projecting amount of the core wire 1a from the tip of the core wire crimp piece 111b becomes the minimum, so that the tip of the core wire 1a hardly spreads in the vertical direction and in the horizontal direction.

If the thickness of the mold resin 120 at the side close to the first step 121a is set such that the distance between the tip of the core wire 1a and the surface of the first step 121a becomes at least 0.5 mm even when the projecting amount of the core wire 1a is within any range from the maximum to the minimum, sufficient waterproof property can be ensured in any cases.

In order to ensure a certain extent of thickness of the mold resin 120 at the side of the tip of the core wire 1a as described above, the vertical thickness of the mold resin 120 located on the plate-like portion 113 to the first step 121a at the side of the tip of the core wire 1a is inevitably increased. In such case, the reaction time at the portion with a large vertical thickness of the first step 121a side of the first portion 121 might be longer than the reaction time at the other portion, unless the first recess 123 is formed. In view of this, the first recess 123 is formed to facilitate the filling of resin to the first portion 121 close to the first step 121a side and to adjust the reaction time of the resin to be equal to the reaction time at the other portion.

The opening length of the first recess 123 in the transverse direction (i.e., the direction same as the axis direction of the core wire 1a from the first step 121a toward the tip of the second portion 122) is set to be equal to or smaller than 1 mm, for example. The opening width of the first recess 123 in the longitudinal direction (i.e., the direction same as the direction, crossing the axis direction of the core wire 1a, between the side faces of the second portion 122) is set to be equal to or larger than the width of the core wire 1a of the covered electric wire 1, for example.

Accordingly, the first recess 123 in the present embodiment is formed to be open in an elliptic shape as viewed from top. Notably, the first recess 123 can be formed into a circular shape as viewed from top from the viewpoint of the relation with the opening length, in the case where the width of the core wire 1a is extremely shorter than the illustrated example, for example.

Figure 4:
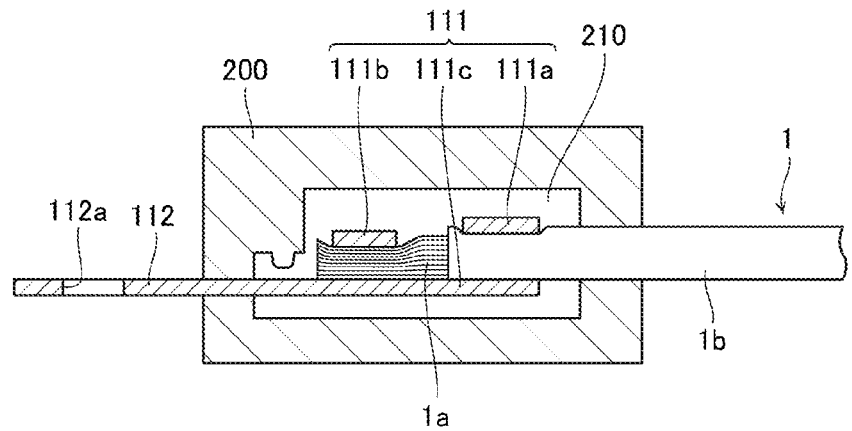
FIG. 4 is a sectional view illustrating a manufacturing process of the mold resin according to the first embodiment of the present invention.

Next, a manufacturing process of the terminal portion according to the first embodiment will be described with reference to FIG. 4. FIG. 4 is a sectional view illustrating the manufacturing process of the mold resin 120 according to the first embodiment. As illustrated in FIG. 4, upon forming the mold resin 120 to the terminal portion 100 of the connection terminal 110, the connection terminal 110 is firstly inserted into a cavity 210 of a die 200 except for the contact piece 112 and its surrounding portion.

Then, a resin that is a material of the mold resin 120 is cast into the cavity 210 of the die 200. This resin is a hygroscopic reactive type urethane hot melt resin having property of being cured with a hygroscopic reaction. For example, "QR3460" or "QR9515" manufactured by Henkel Japan Ltd. can be used for this resin. Notably, the predetermined position on the inner periphery of the cavity 210 is processed beforehand into a shape for forming the above first step 121a and the first recess 123.

After the resin is cast into the cavity 210, the die 200 is then heated from the bottom surface. The heating accelerates the hygroscopic reaction of the resin filled in the cavity 210, which brings cure progress of the resin. Thus, hardening of the resin is progressed then it becomes the mold resin 120.

Generally, the vertical thickness of the portion (i.e., the electric wire crimp portion 111) of the core wire crimp piece 111b (and the insulating coating crimp piece 111a) of the connection terminal 110 becomes large, while the vertical thickness of the plate-like portion 113 of the connection terminal 110 located toward the tip side than the core wire crimp piece 111b and further toward the tip side than the tip of the core wire 1a of the connection terminal 110 becomes small, as described above.

Therefore, if a simple mold resin 120 with a cuboid shape covering the portion of the core wire crimp piece 111b is formed by merely curing a resin with the thickness corresponding to the thickness of the portion of the core wire crimp piece 111b, the thickness of the mold resin 120 at the plate-like portion 113 becomes extremely large. With this state, the reaction speed at the plate-like portion 113 in the vertical direction is low, which takes time to cure the mold resin 120 as a whole.

In addition, there is a conflicting problem in which the thickness of the resin at the plate-like portion 113 has to be increased with a certain extent of margin in order to prevent the tip of the core wire 1a from projecting from the mold resin 120 to be exposed due to the influence of variation in the crimp position between the core wire 1a of the covered electric wire 1 and the core wire crimp piece 111b of the connection terminal 110 or the variation in the projecting amount of the core wire 1a from the insulating coating 1b of the covered electric wire 1.

For this, in the first embodiment, the mold resin 120 has the first step 121a and the first recess 123. With this configuration, heat can efficiently be transferred through the first recess 123 to the resin at the plate-like portion 113 which is likely to have a thickness larger than the thickness of the resin at the portion of the core wire crimp piece 111b, whereby the reaction in the vertical direction can be progressed as a whole. Thus, the curing time of the mold resin 120 can be shortened, compared to the simple mold resin with the cuboid shape described above. In addition, the mold resin 120 which prevents the projection of the core wire 1a can be formed without being subject to the above influence.

Second Embodiment

Figure 5:
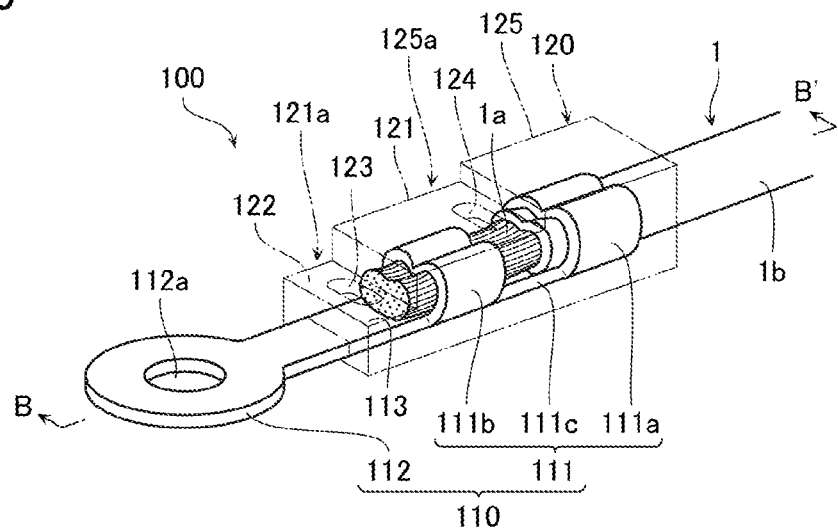
FIG. 5 is a perspective view illustrating a terminal portion of a covered electric wire in a terminal structure for a covered electric wire according to a second embodiment of the present invention, wherein a mold resin is indicated by a virtual line.
Figure 6:
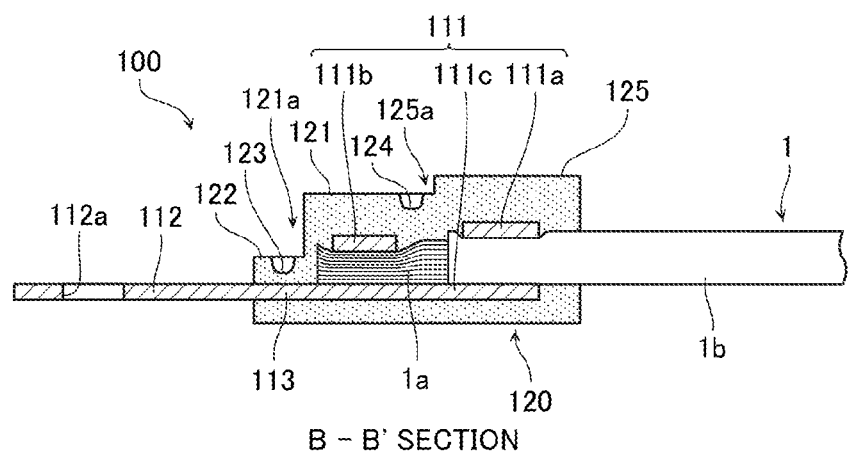
FIG. 6 is a sectional view taken along line B-B' in FIG. 5.
Figure 7:
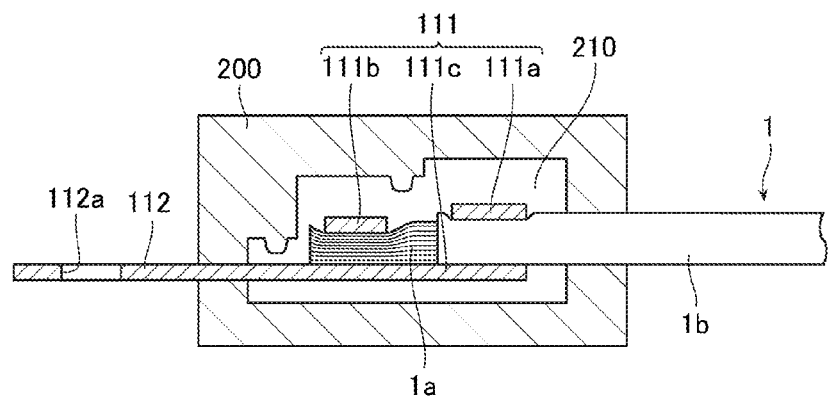
FIG. 7 is a sectional view illustrating a manufacturing process of the mold resin according to the second embodiment of the present invention.

Next, a structure of a terminal portion 100 of a covered electric wire according to a second embodiment of the present invention will be described with reference to FIGS. 5 to 7. FIG. 5 is a perspective view illustrating the terminal portion of the covered electric wire in the terminal structure for a covered electric wire according to the second embodiment of the present invention, wherein a mold resin is indicated by a virtual line. FIG. 6 is a sectional view taken along line B-B' in FIG. 5, and FIG. 7 is a sectional view illustrating a manufacturing process of a mold resin 120.

In the description below, the portions overlapped with the portions already described in the first embodiment are identified by the same reference numerals, and the description thereof will sometimes be omitted. The configurations of the covered electric wire 1 and the connection terminal 110 have already been described, so that their description will not be repeated.

As illustrated in FIGS. 5 and 6, similar to the first embodiment, the mold resin 120 mounted to the terminal portion 100 in the second embodiment includes a first portion 121, a second portion 122, a first step 121a, and a first recess 123. However, the mold resin 120 in the second embodiment is different from the first embodiment in the following point. Specifically, the first portion 121 of the mold resin 120 covers from the periphery of a core wire crimp piece 111b including the tip of a core wire 1a of the covered electric wire 1 to the tip of an insulating coating 1b of the covered electric wire 1.

The mold resin 120 also includes a third portion 125 which is continuous with the first portion 121 for covering the periphery of an insulating coating crimp piece 111a including the insulating coating 1b of the covered electric wire 1 at the distal end side of the insulating coating crimp piece 111a. The mold resin 120 also has a second step 125a formed between the first portion 121 and the third portion 125. A second recess 124 which is open upward and recessed downward toward the connection terminal 110 is formed on the first portion 121 in the vicinity of the second step 125a. The thickness of the third portion 125, and the recessed amount, opening length, opening width, and shape of the second recess 124 are determined as described above.

As illustrated in FIG. 7, in order to form the mold resin 120 at the terminal portion 100 of the connection terminal 110, the connection terminal 110 is inserted into the cavity 210 of the die 200, a material resin is cast into the cavity 210, and the die is heated, as described above. In this way, the mold resin 120 may be formed.

In the second embodiment, the mold resin 120 has the second step 125a and the second recess 124. Therefore, the second embodiment provides the effect described below in addition to the operation and effect provided by the first embodiment. Specifically, heat is efficiently transferred to the resin at the portion of the core wire crimp piece 111b, which is likely to have a thickness larger than the thickness of the resin at the portion of the insulating coating crimp piece 111a, through the second recess 124, whereby the reaction can be progressed as a whole. Thus, the curing time of the mold resin 120 can be shortened.

Third Embodiment

Figure 8:
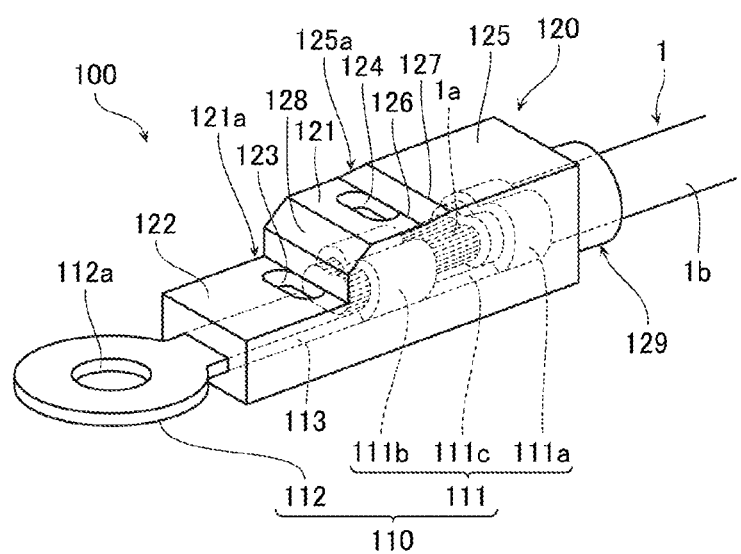
FIG. 8 is a perspective view illustrating a terminal portion of a covered electric wire in a terminal structure for a covered electric wire according to a third embodiment of the present invention, wherein a mold resin is indicated by a solid line.
Figure 9:
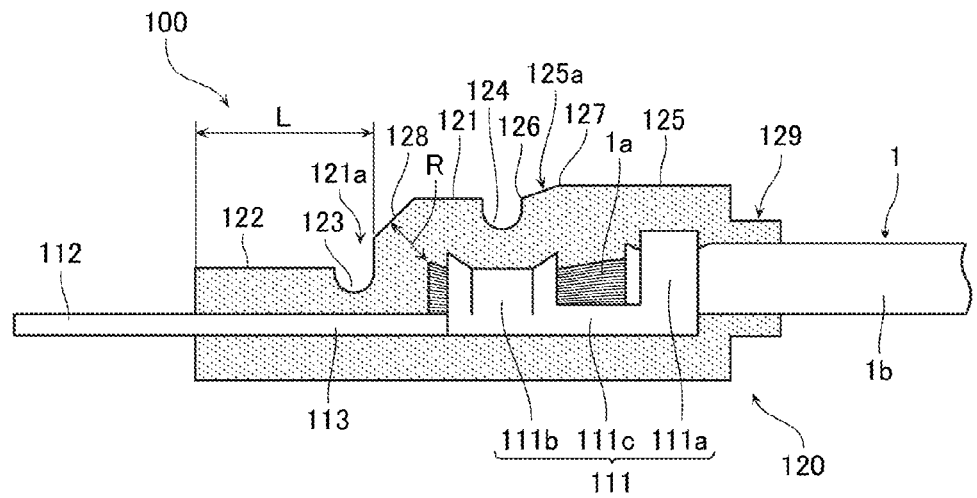
FIG. 9 is a side view illustrating the terminal portion of the covered electric wire, wherein the mold resin is illustrated in section.

FIG. 8 is a perspective view illustrating a terminal portion of a covered electric wire in a terminal structure for a covered electric wire according to a third embodiment of the present invention, wherein a mold resin is indicated by a solid line. FIG. 9 is a side view illustrating the terminal portion of the covered electric wire, wherein the mold resin is illustrated in section. As illustrated in FIGS. 8 and 9, similar to the second embodiment, the mold resin 120 mounted to the terminal portion 100 in the third embodiment has a first portion 121, a second portion 122, a third portion 125, a first step 121a, a second step 125a, a first recess 123, and a second recess 124. However, the mold resin 120 in the third embodiment is different from the second embodiment in the following point.

Specifically, in the third embodiment, the second step 125a is formed to have a slope face having a step edge 126 close to the first portion 121 side and a step edge 127 close to the third portion 125 side. The second step 125a is formed such that the step edge 127 continuous with the top surface of the third portion 125 is located at the position on the back end of the core wire crimp piece 111b.

The second recess 124 is formed on the position of the first portion 121 on the core wire crimp piece 111b with the state in which a part of the opening edge of the second recess 124 is continuous with the step edge 126 of the second step 125a close to the first portion 121 side. Similar to the first recess 123, the opening length and opening width of the second recess 124 are set to be equal to or smaller than about 1 mm and equal to or larger than the width of the core wire 1a, respectively.

With the formation of the second step 125a on the position of the back end of the core wire crimp piece 111b, the minimum necessary thickness of the third portion 125 can be ensured, wherever the insulating coating 1b is present between the insulating coating crimp piece 111a and the core wire crimp piece 111b according to the difference in the projecting amount of the core wire 1a as described above. When the second step 125a is formed not to have a slope face but to have a vertical face as in the second embodiment, the step edges 126, 127 are formed to be located to overlap in the vertical direction on a position at the back end of the core wire crimp piece 111b.

With the formation of the second recess 124 at the position on the core wire crimp piece 111b, the second recess 124 can be formed on the portion where the thickness from the bottom surface of the connection portion 111c is constant. With this, reproducibility of the operation and effect with the second recess 124 can surely be attained for each product. Notably, since the first recess 123 is also formed on the plate-like portion 113 having constant thickness, the same as the second recess 124 can be applied to the first recess 123.

A step face 128 inclined obliquely downward from the first portion 121 to the second portion 122 is formed between the first step 121a and the top surface of the first portion 121. The distance R between the surface of the first step 121a including the step surface 128 and the tip of the core wire 1a of the covered electric wire 1 is set to be at least 0.5 mm as described above. With the formation of the inclined step surface 128 between the first step 121a and the top surface of the first portion 121, the above-described extraction of the terminal portion 100 from the die 200 can be more facilitated.

The second portion 122 is formed such that the length L from the first step 121a in the direction same as the axis direction of the core wire 1a to the tip face becomes equal to or larger than about 2.6 mm. The second portion 122 is formed to have a length equal to or larger than a predetermined length as described above. Therefore, even if force in the bending direction to an extent of generating a gap between the plate-like portion 113 and the mold resin 120 at the tip face of the second portion 122 is applied to the plate-like portion 113 of the connection terminal 110, for example, the distance at the close contact portion (sealed portion) between the mold resin 120 directing to the first portion 121 side and the plate-like portion 113 can sufficiently be ensured. Accordingly, even if moisture enters from the gap, the moisture cannot reach the inside of the mold resin 120, whereby sufficient waterproof property can be ensured.

Fourth Embodiment

Figure 10:
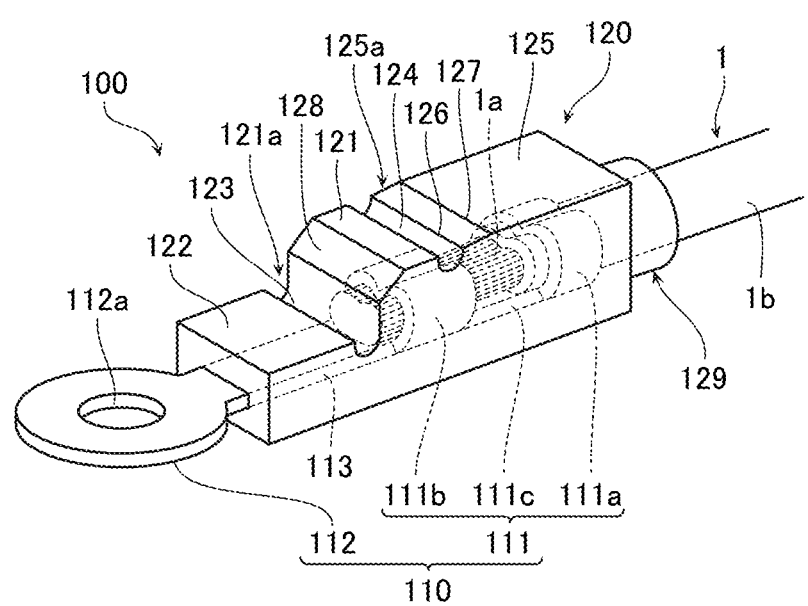
FIG. 10 is a perspective view illustrating a terminal portion of a covered electric wire in a terminal structure for a covered electric wire according to a fourth embodiment of the present invention, wherein a mold resin is indicated by a solid line.

FIG. 10 is a perspective view illustrating a terminal portion of a covered electric wire in a terminal structure for a covered electric wire according to a fourth embodiment of the present invention, wherein a mold resin is indicated by a solid line. As illustrated in FIG. 10, a mold resin 120 provided to a terminal portion 100 in the fourth embodiment is different from the third embodiment in the shapes of first and second recesses 123 and 124. Specifically, the first and second recesses 123 and 124 are not formed into an elliptic shape, but formed into a groove shape penetrating through both side faces of the second portion 122 and the first portion 121. This configuration can also provide the operation and effect similar to the third embodiment.

DESCRIPTION OF THE REFERENCE NUMERALS

1 Covered electric wire
1*a* Core wire
1*b* Insulating coating
100 Terminal portion
110 Connection terminal
111 Electric wire crimp portion
111*a* Insulating coating crimp piece
111*b* Core wire crimp piece
112 Contact piece
112*a* Screw insertion hole
113 Plate-like portion
120 Mold resin
121 First portion
121*a* First step
122 Second portion
123 First recess
124 Second recess
125 Third portion
125*a* Second recess
200 Die
210 Cavity

The invention claimed is:

1. A terminal waterproof structure for a covered electric wire which comprises a core wire and a covering material, comprising:
a terminal portion including a tip of the covered electric wire which includes a projecting part of the core wire projected from an end of the covering material;
a connection terminal having a front end and a back end, and having a crimp portion in a back end side crimped to the terminal portion; and
a mold resin of a hygroscopic reactive type covering and sealing the terminal portion of the covered electric wire and the crimp portion of the connection terminal to prevent the terminal portion of the covered electric wire and the crimp portion of the connection terminal from being exposed to water,
the crimp portion including a conductive crimp portion crimped to the projecting part of the covered electric wire,
the mold resin including:
a first portion covering the conductive crimp portion and the tip of the covered electric wire;
a second portion covering a part of the connection terminal which is further toward a front end side of the connection terminal than the tip of the covered electric wire; and
a first step disposed at a boundary between the first portion and the second portion such that the height of the mold resin decreases from the first portion to the second portion,
a first recess formed in the second portion in the vicinity of the first step so as to recess from a surface of the second portion toward the connection terminal,
wherein the first portion is positioned entirely on the crimp portion including the tip of the covered electric wire and the second portion is positioned further toward the front end side of the connection terminal than the tip of the covered electric wire.

2. The terminal waterproof structure for a covered electric wire according to claim 1, wherein
the crimp portion includes a covering material crimp portion crimped to a covering material of the covered electric wire,
a second step is formed between a third portion of the mold resin covering the covering material crimp portion and the first portion of the mold resin, and
a second recess is formed on the first portion in the vicinity of the second step.

3. The terminal waterproof structure for a covered electric wire according to claim 1, wherein
the distance between a step surface of the first step of the first portion and the tip of the core wire of the covered electric wire is at least 0.5 mm.

4. The terminal waterproof structure for a covered electric wire according to claim 1, wherein
a length from the first step of the second portion to a tip surface is equal to or larger than 2.6 mm.

5. A terminal waterproof structure for a covered electric wire, comprising:
a terminal portion including a tip of the covered electric wire;
a connection terminal having a crimp portion crimped to the terminal portion; and
a mold resin of a hygroscopic reactive type covering the terminal portion of the covered electric wire and the crimp portion of the connection terminal,
the crimp portion including a conductive crimp portion crimped to the tip of the covered electric wire,
the mold resin including:
a first portion covering the conductive crimp portion and the tip of the covered electric wire;
a second portion covering a part of the connection terminal which is further toward a tip than the tip of the covered electric wire, the part having a thickness smaller than the thickness of the conductive crimp portion; and
first step formed between the first portion and the second portion such that the height of the mold resin decreases from the first portion to the second portion,
a first recess formed on the second portion in the vicinity of the first step so as to recess toward the connection terminal,
wherein the crimp portion includes a covering material crimp portion crimped to a covering material of the covered electric wire, a second step is formed between a third portion of the mold resin covering the covering material crimp portion and the first portion of the mold resin, and a second recess is formed on the first portion in the vicinity of the second step.

* * * * *